United States Patent
Valentine et al.

(10) Patent No.: US 11,275,588 B2
(45) Date of Patent: Mar. 15, 2022

(54) CONTEXT SAVE WITH VARIABLE SAVE STATE SIZE

(71) Applicant: Intel Corporation, Santa Clara, CA (US)

(72) Inventors: Robert Valentine, Kiryat Tivon (IL); Mark J. Charney, Lexington, MA (US); Rinat Rappoport, Haifa (IL); Vivekananthan Sanjeepan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/624,178

(22) PCT Filed: Jul. 1, 2017

(86) PCT No.: PCT/US2017/040547
§ 371 (c)(1),
(2) Date: Dec. 18, 2019

(87) PCT Pub. No.: WO2019/009870
PCT Pub. Date: Jan. 10, 2019

(65) Prior Publication Data
US 2020/0110608 A1    Apr. 9, 2020

(51) Int. Cl.
*G06F 9/30*    (2018.01)
(52) U.S. Cl.
CPC ...... *G06F 9/30145* (2013.01); *G06F 9/30098* (2013.01)

(58) Field of Classification Search
None
See application file for complete search history.

(56) References Cited

U.S. PATENT DOCUMENTS

| 4,310,879 A | 1/1982 | Pandeya |
| 5,025,407 A | 6/1991 | Gulley et al. |
| 5,170,370 A | 12/1992 | Lee et al. |
| 5,247,632 A | 9/1993 | Newman |
| 5,426,378 A | 6/1995 | Ong |

(Continued)

FOREIGN PATENT DOCUMENTS

| EP | 3547120 A1 | 10/2019 |
| EP | 3646169 A1 | 5/2020 |

(Continued)

OTHER PUBLICATIONS

International Preliminary Report on Patentability, PCT App. No. PCT/US2017/040547, dated Jan. 16, 2020, 12 pages.

(Continued)

*Primary Examiner* — Eric Coleman
(74) *Attorney, Agent, or Firm* — Nicholson De Vos Webster & Elliott, LLP

(57) ABSTRACT

Embodiments of an apparatus comprising a decoder to decode an instruction having fields for an opcode and a destination operand and execution circuitry to execute the decoded instruction to perform a save of processor state components to an area located at a destination memory address specified by the destination operand, wherein a size of the area is defined by at least one indication of an execution of an instruction operating on a specified group of processor states are described.

17 Claims, 13 Drawing Sheets

(56) References Cited

U.S. PATENT DOCUMENTS

| | | | |
|---|---|---|---|
| 5,475,822 A | 12/1995 | Sibigtroth et al. | |
| 5,584,027 A | 12/1996 | Smith | |
| 5,682,544 A | 10/1997 | Pechanek et al. | |
| 5,761,466 A | 6/1998 | Chau | |
| 5,765,216 A | 6/1998 | Weng et al. | |
| 5,887,183 A | 3/1999 | Agarwal et al. | |
| 5,892,962 A | 4/1999 | Cloutier | |
| 6,041,403 A | 3/2000 | Parker et al. | |
| 6,069,489 A | 5/2000 | Iwanczuk et al. | |
| 6,134,578 A * | 10/2000 | Ehlig | G01R 31/318536 712/E9.017 |
| 6,161,219 A | 12/2000 | Ramkumar et al. | |
| 6,212,112 B1 | 4/2001 | Naura et al. | |
| 6,332,186 B1 | 12/2001 | Elwood et al. | |
| 6,487,171 B1 | 11/2002 | Honig et al. | |
| 6,487,524 B1 | 11/2002 | Preuss | |
| 6,505,288 B1 | 1/2003 | Jang et al. | |
| 6,643,765 B1 | 11/2003 | Hansen et al. | |
| 6,647,484 B1 | 11/2003 | Jiang et al. | |
| 6,831,654 B2 * | 12/2004 | Pether | G09G 5/393 345/531 |
| 6,877,020 B1 | 4/2005 | Bratt et al. | |
| 6,944,747 B2 | 9/2005 | Nair et al. | |
| 7,003,542 B2 | 2/2006 | Devir | |
| 7,016,418 B2 | 3/2006 | Wang et al. | |
| 7,107,436 B2 | 9/2006 | Moyer | |
| 7,209,939 B2 | 4/2007 | Castrapel et al. | |
| 7,275,148 B2 | 9/2007 | Moyer et al. | |
| 7,430,578 B2 | 9/2008 | Debes et al. | |
| 7,610,466 B2 | 10/2009 | Moyer | |
| 7,672,389 B2 | 3/2010 | Gueguen | |
| 7,725,521 B2 | 5/2010 | Chen et al. | |
| 7,792,895 B1 | 9/2010 | Juffa et al. | |
| 7,873,812 B1 | 1/2011 | Mimar | |
| 7,912,889 B1 | 3/2011 | Juffa et al. | |
| 7,932,910 B2 | 4/2011 | Hansen et al. | |
| 8,040,349 B1 | 10/2011 | Danskin | |
| 8,051,124 B2 | 11/2011 | Salama et al. | |
| 8,374,284 B2 | 2/2013 | Watson | |
| 8,392,487 B1 | 3/2013 | Mesh et al. | |
| 8,577,950 B2 | 11/2013 | Eichenberger et al. | |
| 8,760,994 B2 | 6/2014 | Wang et al. | |
| 8,817,033 B2 | 8/2014 | Hur et al. | |
| 8,825,988 B2 | 9/2014 | Rupley et al. | |
| 8,904,148 B2 | 12/2014 | Claydon et al. | |
| 8,943,119 B2 | 1/2015 | Hansen et al. | |
| 8,984,043 B2 | 3/2015 | Ginzburg et al. | |
| 9,098,460 B2 | 8/2015 | Yanagisawa | |
| 9,442,723 B2 | 9/2016 | Yang et al. | |
| 9,519,947 B2 | 12/2016 | Nickolls et al. | |
| 9,557,998 B2 | 1/2017 | Ould-Ahmed-Vall et al. | |
| 9,703,708 B2 * | 7/2017 | Alameldeen | G06F 12/0811 |
| 9,906,359 B2 | 2/2018 | Gueron | |
| 9,960,907 B2 | 5/2018 | Gueron | |
| 9,996,350 B2 | 6/2018 | Lee et al. | |
| 10,275,243 B2 | 4/2019 | Grochowski et al. | |
| 10,535,114 B2 | 1/2020 | Bolz | |
| 10,600,475 B2 | 3/2020 | Yadavalli | |
| 10,620,951 B2 | 4/2020 | Azizi et al. | |
| 10,649,772 B2 | 5/2020 | Bradford et al. | |
| 10,719,323 B2 | 7/2020 | Baum et al. | |
| 10,846,087 B2 | 11/2020 | Plotnikov et al. | |
| 10,896,043 B2 | 1/2021 | Toll et al. | |
| 2002/0032710 A1 | 3/2002 | Saulsbury et al. | |
| 2003/0038547 A1 | 2/2003 | Reinhardt et al. | |
| 2003/0126176 A1 | 7/2003 | Devir | |
| 2003/0221089 A1 | 11/2003 | Spracklen | |
| 2004/0097856 A1 | 5/2004 | Cipra et al. | |
| 2004/0111587 A1 | 6/2004 | Nair et al. | |
| 2004/0228295 A1 | 11/2004 | Zhang et al. | |
| 2005/0053012 A1 | 3/2005 | Moyer | |
| 2005/0055534 A1 | 3/2005 | Moyer | |
| 2005/0055535 A1 | 3/2005 | Moyer et al. | |
| 2005/0055543 A1 | 3/2005 | Moyer | |
| 2005/0094893 A1 | 5/2005 | Samadani | |
| 2005/0193050 A1 | 9/2005 | Sazegari | |
| 2005/0289208 A1 | 12/2005 | Harrison et al. | |
| 2006/0095721 A1 | 5/2006 | Biles et al. | |
| 2006/0101245 A1 | 5/2006 | Nair et al. | |
| 2006/0190517 A1 | 8/2006 | Guerrero | |
| 2007/0006231 A1 * | 1/2007 | Wang | G06F 9/3017 718/100 |
| 2007/0126474 A1 | 6/2007 | Chang et al. | |
| 2007/0186210 A1 | 8/2007 | Hussain et al. | |
| 2007/0271325 A1 | 11/2007 | Juffa et al. | |
| 2007/0280261 A1 | 12/2007 | Szymanski | |
| 2008/0031545 A1 | 2/2008 | Nowicki et al. | |
| 2008/0071851 A1 | 3/2008 | Zohar et al. | |
| 2008/0140994 A1 | 6/2008 | Khailany et al. | |
| 2008/0162824 A1 | 7/2008 | Jalowiecki et al. | |
| 2008/0208942 A1 | 8/2008 | Won et al. | |
| 2008/0301414 A1 | 12/2008 | Pitsianis et al. | |
| 2009/0006816 A1 | 1/2009 | Hoyle et al. | |
| 2009/0043836 A1 | 2/2009 | Dupaquis et al. | |
| 2009/0113170 A1 | 4/2009 | Abdallah | |
| 2009/0172365 A1 | 7/2009 | Orenstien et al. | |
| 2009/0196103 A1 | 8/2009 | Kim | |
| 2009/0292758 A1 | 11/2009 | Brokenshire et al. | |
| 2009/0300091 A1 | 12/2009 | Brokenshire et al. | |
| 2009/0300249 A1 | 12/2009 | Moyer et al. | |
| 2010/0106692 A1 | 4/2010 | Moloney | |
| 2010/0180100 A1 | 7/2010 | Lu et al. | |
| 2010/0199247 A1 | 8/2010 | Huynh et al. | |
| 2010/0325187 A1 | 12/2010 | Juffa et al. | |
| 2011/0040821 A1 | 2/2011 | Eichenberger et al. | |
| 2011/0040822 A1 | 2/2011 | Eichenberger et al. | |
| 2011/0072065 A1 | 3/2011 | Mimar | |
| 2011/0153707 A1 | 6/2011 | Ginzburg et al. | |
| 2012/0011348 A1 | 1/2012 | Eichenberger et al. | |
| 2012/0079252 A1 | 3/2012 | Sprangle | |
| 2012/0113133 A1 | 5/2012 | Shpigelblat | |
| 2012/0137074 A1 | 5/2012 | Kim et al. | |
| 2012/0144130 A1 | 6/2012 | Fossum | |
| 2012/0254588 A1 | 10/2012 | Adrian et al. | |
| 2012/0254592 A1 | 10/2012 | San et al. | |
| 2012/0290608 A1 | 11/2012 | Dantressangle et al. | |
| 2012/0314774 A1 | 12/2012 | Yang et al. | |
| 2013/0016786 A1 | 1/2013 | Segall | |
| 2013/0042093 A1 * | 2/2013 | Van Dyke | G06F 9/30101 712/228 |
| 2013/0076761 A1 | 3/2013 | Ellis et al. | |
| 2013/0262548 A1 | 10/2013 | Ge et al. | |
| 2013/0305020 A1 | 11/2013 | Valentine et al. | |
| 2013/0339668 A1 | 12/2013 | Ould-Ahmed-Vall et al. | |
| 2014/0019713 A1 | 1/2014 | Ould-Ahmed-Vall et al. | |
| 2014/0032876 A1 | 1/2014 | Burkart et al. | |
| 2014/0149480 A1 | 5/2014 | Catanzaro et al. | |
| 2014/0157287 A1 * | 6/2014 | Howes | G06F 9/461 718/108 |
| 2014/0172937 A1 | 6/2014 | Linderman et al. | |
| 2014/0281432 A1 | 9/2014 | Anderson | |
| 2015/0052333 A1 | 2/2015 | Hughes et al. | |
| 2015/0067302 A1 | 3/2015 | Gueron | |
| 2015/0135195 A1 * | 5/2015 | Khare | H05K 999/99 718/108 |
| 2015/0154024 A1 | 6/2015 | Anderson et al. | |
| 2015/0199266 A1 | 7/2015 | Franchetti et al. | |
| 2015/0242267 A1 | 8/2015 | Modarresi | |
| 2015/0378734 A1 | 12/2015 | Hansen et al. | |
| 2016/0011870 A1 | 1/2016 | Plotnikov et al. | |
| 2016/0165321 A1 | 6/2016 | Denoual et al. | |
| 2016/0188337 A1 | 6/2016 | Lee et al. | |
| 2016/0239706 A1 | 8/2016 | Dijkman et al. | |
| 2016/0246619 A1 * | 8/2016 | Chang | G06F 9/461 |
| 2017/0053375 A1 | 2/2017 | Bolz | |
| 2017/0097824 A1 | 4/2017 | Elmer et al. | |
| 2017/0220352 A1 | 8/2017 | Woo et al. | |
| 2017/0337156 A1 | 11/2017 | Yadavalli | |
| 2018/0004510 A1 | 1/2018 | Grochowski et al. | |
| 2018/0113708 A1 | 4/2018 | Corbal et al. | |
| 2018/0189227 A1 | 7/2018 | Korthikanti et al. | |
| 2018/0321938 A1 | 11/2018 | Boswell et al. | |
| 2019/0042202 A1 | 2/2019 | Sade et al. | |
| 2019/0042248 A1 | 2/2019 | Bradford et al. | |

(56) References Cited

U.S. PATENT DOCUMENTS

| | | |
|---|---|---|
| 2019/0042256 A1 | 2/2019 | Sade et al. |
| 2019/0042541 A1 | 2/2019 | Sade et al. |
| 2019/0042542 A1 | 2/2019 | Narayanamoorthy et al. |
| 2019/0121837 A1 | 4/2019 | Azizi et al. |
| 2019/0205137 A1 | 7/2019 | Meadows et al. |
| 2019/0347310 A1 | 11/2019 | Valentine et al. |
| 2020/0065352 A1 | 2/2020 | Valentine et al. |
| 2020/0097291 A1 | 3/2020 | Hughes et al. |
| 2020/0210517 A1 | 7/2020 | Baum et al. |
| 2020/0233665 A1 | 7/2020 | Valentine et al. |
| 2020/0233666 A1 | 7/2020 | Valentine et al. |
| 2020/0233667 A1 | 7/2020 | Valentine et al. |

FOREIGN PATENT DOCUMENTS

| | | |
|---|---|---|
| KR | 10-2011-0079495 A | 7/2011 |
| WO | 2004/053841 A2 | 6/2004 |
| WO | 2006/081094 A2 | 8/2006 |
| WO | 2007/143278 A2 | 12/2007 |
| WO | 2008/037975 A2 | 4/2008 |
| WO | 2013/048369 A1 | 4/2013 |
| WO | 2016/003740 A1 | 1/2016 |
| WO | 2016/075158 A1 | 5/2016 |
| WO | 2016/105727 A1 | 6/2016 |
| WO | 2016/105841 A1 | 6/2016 |
| WO | 2018/125250 A1 | 7/2018 |
| WO | 2018/174927 A1 | 9/2018 |
| WO | 2019/002811 A1 | 1/2019 |

OTHER PUBLICATIONS

International Search Report and Written Opinion, PCT App. No. PCT/US2017/040547, dated Mar. 30, 2018, 15 pages.
Exposing Memory Access Patterns to Improve Instruction and Memory Efficiency in GPUs' by Neal C. Crago et al., ACM Transactions on Architecture and Code Optimization, vol. 15, No. 4, Article 45. Publication date: Oct. 2018. (Year: 2018).
'Brief Introduction to Vectors and Matrices' archived from unf.edu on Dec. 30, 2008. (Year: 2008).
'Incompatibilities with MATLAB in Variable-Size Support for Code Generation' by MathWorks, archive from 2015. (Year: 2015).
'Instruction Decoders and Combinatorial Circuits' from lateblt.tripod, archived from Nov. 2016. (Year: 2016).
'Zeroing one or more matrix rows or columns' from Stackoverflow, Apr. 2015. (Year: 2015).
Corrected Notice of Allowability, U.S. Appl. No. 15/201,442, dated Jan. 22, 2019, 5 pages.
Corrected Notice of Allowability, U.S. Appl. No. 15/201,442, dated Mar. 11, 2019, 2 pages.
International Preliminary Report on Patentability, PCT App. No. PCT/US2017/040534, dated Oct. 3, 2019, 9 pages.
International Preliminary Report on Patentability, PCT App. No. PCT/US2017/040536, dated Oct. 3, 2019, 10 pages.
International Preliminary Report on Patentability, PCT App. No. PCT/US2017/040537, dated Oct. 3, 2019, 10 pages.
International Preliminary Report on Patentability, PCT App. No. PCT/US2017/040538, dated Oct. 3, 2019, 10 pages.
International Preliminary Report on Patentability, PCT App. No. PCT/US2017/040539, dated Oct. 3, 2019, 11 pages.
International Preliminary Report on Patentability, PCT App. No. PCT/US2017/040540, dated Oct. 3, 2019, 9 pages.
International Preliminary Report on Patentability, PCT App. No. PCT/US2017/040541, dated Oct. 3, 2019, 10 pages.
International Preliminary Report on Patentability, PCT App. No. PCT/US2017/040543, dated Oct. 3, 2019, 11 pages.
International Preliminary Report on Patentability, PCT App. No. PCT/US2017/040544, dated Oct. 3, 2019, 11 pages.
International Preliminary Report on Patentability, PCT App. No. PCT/US2017/040545, dated Oct. 3, 2019, 10 pages.
International Preliminary Report on Patentability, PCT App. No. PCT/US2017/040546, dated Oct. 3, 2019, 10 pages.
International Preliminary Report on Patentability, PCT App. No. PCT/US2017/040548, dated Oct. 3, 2019, 10 pages.
International Search Report and Written Opinion, PCT App. No. PCT/US2017/040534, dated Jan. 3, 2018, 11 pages.
International Search Report and Written Opinion, PCT App. No. PCT/US2017/040536, dated Dec. 20, 2017, 11 pages.
International Search Report and Written Opinion, PCT App. No. PCT/US2017/040537, dated Dec. 20, 2017, 11 pages.
International Search Report and Written Opinion, PCT App. No. PCT/US2017/040538, dated Jan. 9, 2018, 12 pages.
International Search Report and Written Opinion, PCT App. No. PCT/US2017/040539, dated Dec. 20, 2017, 12 pages.
International Search Report and Written Opinion, PCT App. No. PCT/US2017/040540, dated Jan. 3, 2018, 14 pages.
International Search Report and Written Opinion, PCT App. No. PCT/US2017/040541, dated Dec. 20, 2017, 11 pages.
International Search Report and Written Opinion, PCT App. No. PCT/US2017/040543, dated Dec. 14, 2017, 15 pages.
International Search Report and Written Opinion, PCT App. No. PCT/US2017/040544, dated Dec. 14, 2017, 13 pages.
International Search Report and Written Opinion, PCT App. No. PCT/US2017/040545, dated Jan. 3, 2018, 11 pages.
International Search Report and Written Opinion, PCT App. No. PCT/US2017/040546, dated Jan. 24, 2018, 15 pages.
International Search Report and Written Opinion, PCT App. No. PCT/US2017/040548, dated Dec. 20, 2017, 17 pages.
Lahr Dave, "Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.
Non-Final Office Action, U.S. Appl. No. 15/201,442, dated May 4, 2018, 11 pages.
Non-Final Office Action, U.S. Appl. No. 16/398,200, dated Jul. 28, 2020, 17 pages.
Non-Final Office Action, U.S. Appl. No. 16/487,766, dated Aug. 3, 2020, 13 pages.
Non-Final Office Action, U.S. Appl. No. 16/487,784, dated Aug. 3, 2020, 19 pages.
Notice of Allowance, U.S. Appl. No. 15/201,442, dated Dec. 14, 2018, 5 pages.
Corrected Notice of Allowability, U.S. Appl. No. 16/474,483, dated Dec. 1, 2020, 2 pages.
Non Final Office Action, U.S. Appl. No. 16/487,777, dated Oct. 27, 2020, 12 pages.
Non-Final Office Action, U.S. Appl. No. 16/487,747, dated Oct. 1, 2020, 13 pages.
Non-Final Office Action, U.S. Appl. No. 16/487,755, dated Nov. 24, 2020, 10 pages.
Non-Final Office Action, U.S. Appl. No. 16/487,774, dated Dec. 21, 2020, 13 pages.
Non-Final Office Action, U.S. Appl. No. 16/487,787, dated Oct. 1, 2020, 16 pages.
Notice of Allowance, U.S. Appl. No. 16/474,483, dated Sep. 2, 2020, 9 pages.
Supplementary European Search Report and Search Opinion, EP App. No. 17901884.1, dated Dec. 14, 2020, 12 pages.
Yang et al., "Research and Design of Dedicated Instruction for Reconfigurable Matrix Multiplication of VLIW Processor", International Conference on Intelligent Networking and Collaborative Systems, 2016, 4 pages.
'CIS-77—The Instruction Cycle' from c-iump.com, 2016. (Year: 2016).
'CLEAR opcode in rpgle-go4as400.com' from Go4AS400, 2016. (Year: 2016).
'Spotlight on: The Fetchdecode Execute Cycle' by Will Fastiggi, 2016. (Year: 2016).
Final Office Action, U.S. Appl. No. 16/487,747, dated May 11, 2021, 10 pages.
Final Office Action, U.S. Appl. No. 16/487,766, dated Mar. 19, 2021, 18 pages.

(56) References Cited

OTHER PUBLICATIONS

Final Office Action, U.S. Appl. No. 16/487,784, dated Mar. 16, 2021, 17 pages.
Non-Final Office Action, U.S. Appl. No. 16/486,960, dated Mar. 3, 2021, 10 pages.
Non-Final Office Action, U.S. Appl. No. 16/474,507, dated May 5, 2021, 6 pages.
Notice of Allowance, U.S. Appl. No. 16/487,755, dated Apr. 1, 2021, 9 pages.
Notice of Allowance, U.S. Appl. No. 16/487,777, dated Mar. 26, 2021, 7 pages.
Notice of Allowance, U.S. Appl. No. 16/487,787, dated Mar. 31, 2021, 10 pages.
Supplementary European Search Report and Search Opinion, EP App. No. 17901997.1, dated Feb. 25, 2021, 11 pages.
'Hardware Acceleration of Matrix Multiplication on a Xilinx FPGA' by Nirav Dave et al., copyright 2007, IEEE. (Year: 2007), 4 pages.
'High-level opcodes' from unthought.net, 1999. (Year: 1999), 3 pages.
International Preliminary Reporton Patentability, PCT App. No. PCT/US2017/036038, Jan. 17, 2019, 14 pages.
Non-Final Office Action, U.S. Appl. No. 16/487,766, dated Sep. 14, 2021, 18 pages.
Non-Final Office Action, U.S. Appl. No. 16/487,784, dated Jul. 26, 2021, 18 pages.
Notice of Allowance, U.S. Appl. No. 16/474,507, dated Aug. 24, 2021, 6 pages.
Notice of Allowance, U.S. Appl. No. 16/486,960, dated Jul. 7, 2021, 8 pages.
Notice of Allowance, U.S. Appl. No. 16/487,747, dated Aug. 11, 2021, 10 pages.
Notice of Allowance, U.S. Appl. No. 16/487,755, dated Jul. 21, 2021, 9 pages.
Notice of Allowance, U.S. Appl. No. 16/624,178, dated Jul. 23, 2021, 11 pages.

\* cited by examiner

FIG. 5
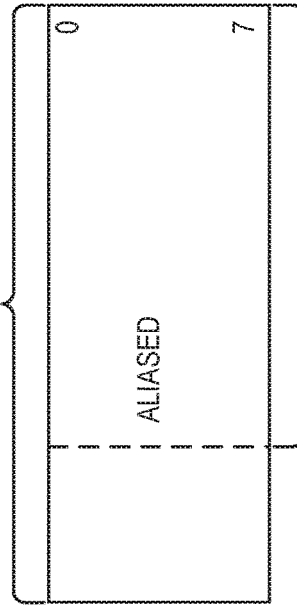
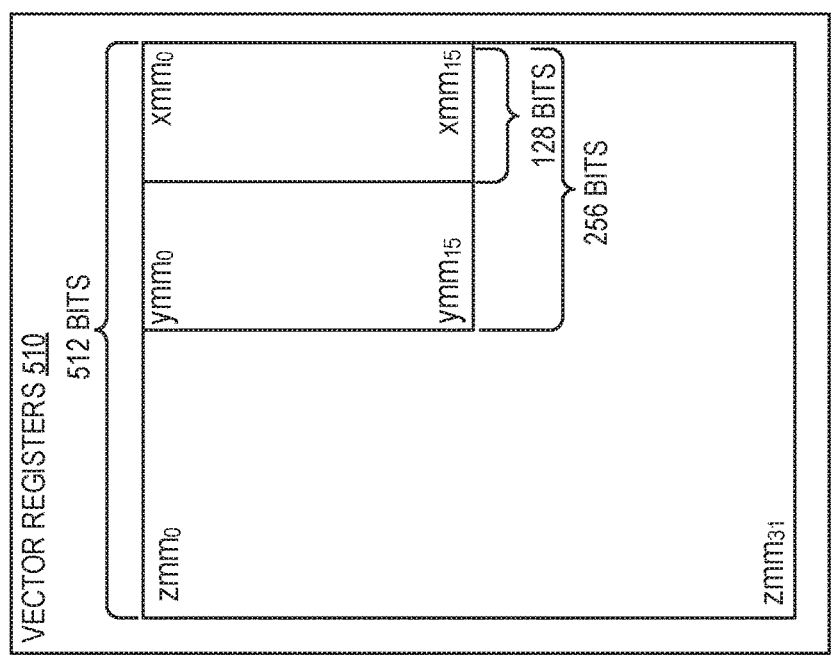

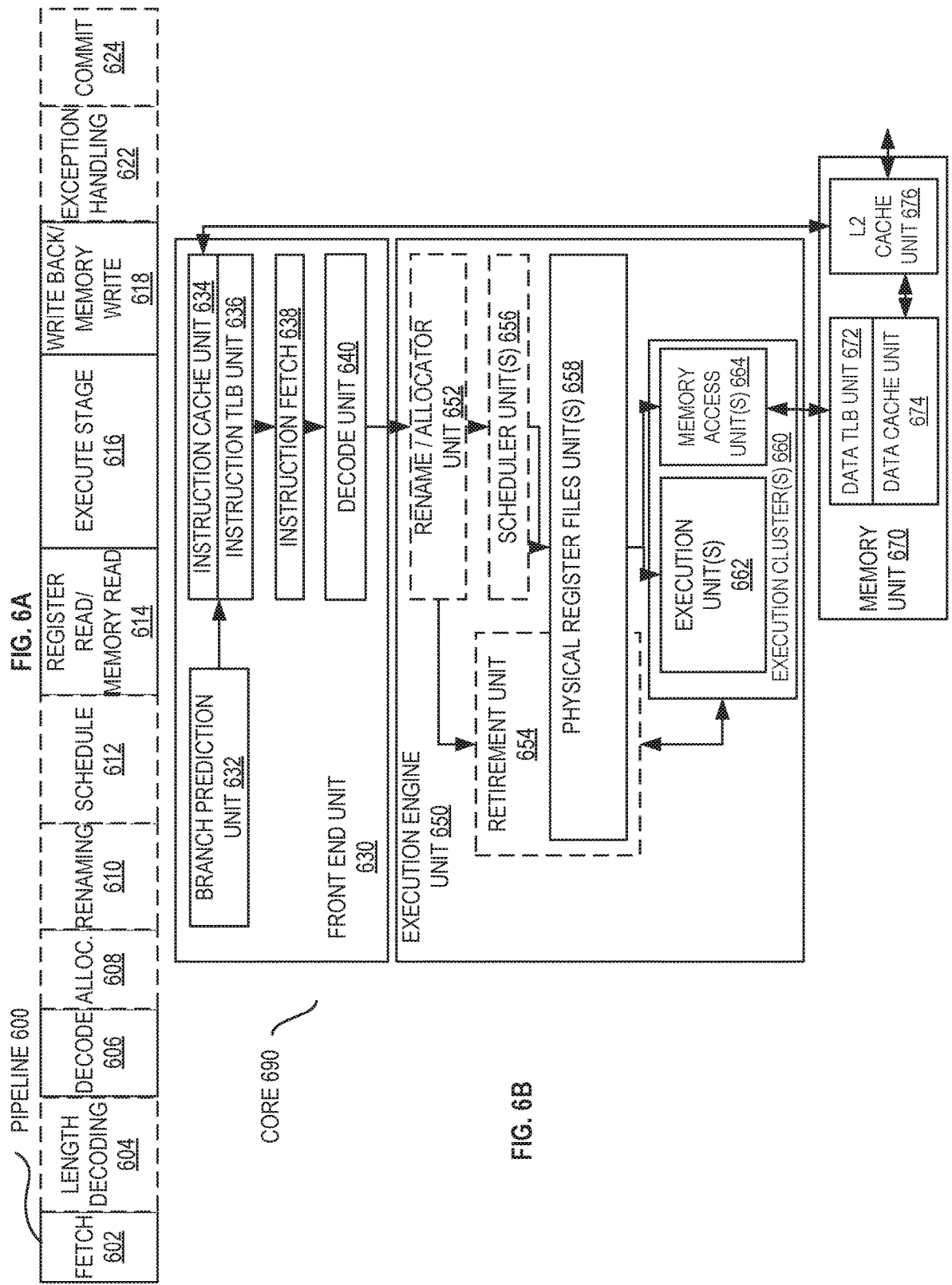

CONTEXT SAVE WITH VARIABLE SAVE STATE SIZE

CROSS-REFERENCE TO RELATED APPLICATIONS

This application is a national stage of International Application No. PCT/US2017/040547, filed Jul. 1, 2017.

FIELD OF INVENTION

The field of invention relates generally to computer processor architecture, and, more specifically, to context saves.

BACKGROUND

Some processors support a feature set for saving and restoring of state components, each of which is a discrete set of processor registers (or parts of registers). In general, each such state component corresponds to a particular processor feature.

BRIEF DESCRIPTION OF THE DRAWINGS

The present invention is illustrated by way of example and not limitation in the figures of the accompanying drawings, in which like references indicate similar elements and in which:

FIG. 5 is a block diagram of a register architecture according to one embodiment of the invention;

FIGS. 6A-B illustrate the in-order pipeline and in-order core;

DETAILED DESCRIPTION

Figure 1:
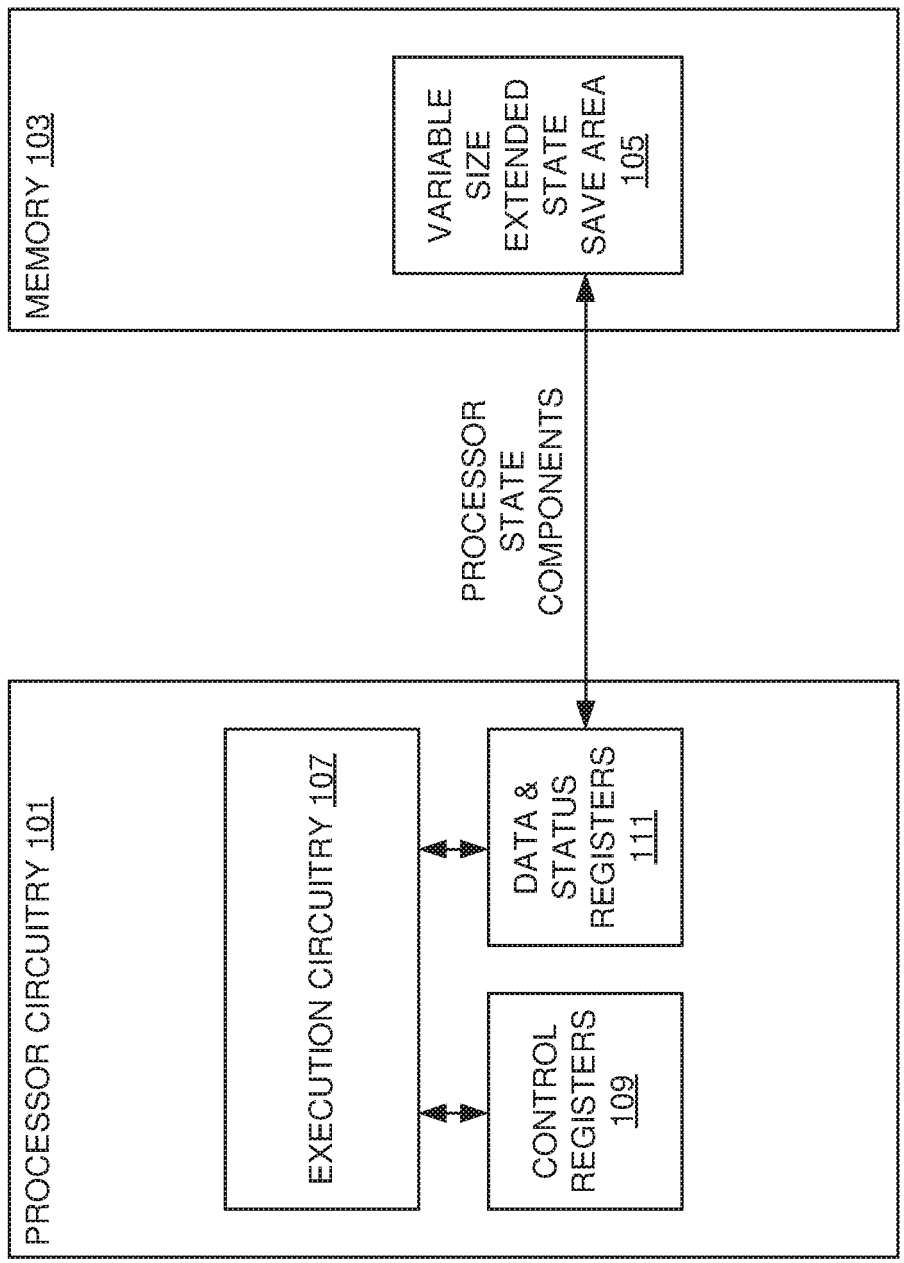
FIG. 1 illustrates an embodiment of aspects hardware support for an XSAVE instruction that does not automatically write all state information.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A context state of a software thread is a portion of the software thread's state that is to be maintained between context switches within a processor. A context state may be stored in architectural registers (e.g., general purpose, floating point, packed data (single instruction, multiple data ("SIMD")), control registers, or other storage areas, such as memory.

The term "context switch" typically refers to a change from one processor execution state to another, such as a software thread switch. A context switch is typically performed either by the operating system or by a user's program. For example, a context switch may occur because of calling a subroutine within a user's program, in which the calling program's context is saved in a storage area, such as a stack when the call to the subroutine occurs, and restored from the storage area when returning from the called subroutine.

Typically, context state is saved to memory or restored to processor registers in groups that may include more context state information that is needed at a given time, due to the organization of context state save areas in memory and the granularity with which these save areas are addressed. Thus, an unnecessarily large size of processor state information may be replaced each time context state is restored from memory. For example, an operating system or user program may only request a subset of context state information pertaining to a particular software thread or other process being performed within a processor. However, some context state save and restore mechanisms may require that all context state pertaining to a thread or other process be restored and/or saved to retrieve any context state information pertaining to the thread or process of interest.

In some embodiments, an extended save ("XSAVE") feature set is used by an operating system (OS) to manage processor XSAVE states such as data registers (general purpose, floating point, packed data (single instruction, multiple data ("SIMD")), etc. Operating systems use the XSAVE instruction to save/restore XSAVE states during a context switch, exception flows, etc. Unfortunately, in some implementations, OSes do not have a way to detect when an application thread is going to use an instruction set operating on a particular XSAVE state. As such, OSes allocate a large enough buffer to save all the enabled XSAVE states for all the threads even for states not used by threads. As the sizes of the XSAVE states become larger, allocating buffer for all enabled states is inefficient. XSAVE buffers used by the OS are typically allocated from non-paged memory and hence inefficient usage of this memory is a significant problem. Detailed herein are embodiments of an XSAVE instruction that allocates a buffer for only those states used by a thread.

FIG. 1 illustrates an embodiment of aspects hardware support for an XSAVE instruction that does not automatically write all state information. Processor circuitry 101 (e.g., a processor core) includes execution circuitry 107 (e.g., an instruction execution pipeline including a fetch unit, decoder, execution unit(s), scheduler, etc.) to execute a decoded XSAVE instruction (details of exemplary execution are discussed with respect to a subsequent figure). This execution circuitry 107 either includes data and status registers 111 (context state saving registers), or has access to them. For example, during execution of a thread, architectural registers (e.g., general purpose, floating point, packed data (single instruction, multiple data ("SIMD")) and status registers comprise the data and status registers 111.

Additionally, control registers (XCR0, XCR1, XCR2, XCR3, etc.) 109 detail a set of processor state components for which the OS provides context management, e.g. x87 FPU state, SSE state, AVX state. For example, the OS programs XCR0 to reflect the features for which it provides context management. Typically, XSAVE states are enabled by an OS by setting the corresponding bit in a control register (e.g., XCR0).

Upon an execution of an XSAVE instruction, memory 103 is written with the contents of the data and status registers 111 in an extended state save area 105. As will be detailed below, embodiments of the XSAVE instruction detailed herein, allocate the extended state save area 105 based on what of the data and status registers 111 have been, or might have been, used during a thread's execution.

As detailed, a control register, e.g., XCR0, can written to by software to enable any one or more of register extensions. Specifically, the XCR0 register maintains a bit for each extension (i.e., a floating-point, SIMD/vector registers, etc.). Software (e.g., the OS) permits software to individually set the various bits to individually enable the x87/SSE/AVX extensions per its own intentions. The XCR0 register has additional, currently undefined bit positions, so that additional extensions can be added in the future and enabled/disabled accordingly.

A CPUID instruction allows software to determine how much memory space is needed to externally store the state information of the enabled extensions. For example, with various input operand values, the CPUID instruction can be executed by the software to determine: i) the total amount of memory space needed to store all the state information of all the enabled extensions; and ii) the total amount of memory space needed to store all the state information of any particular one of the enabled extensions. Thus, for example, if extensions 1 and 2 are enabled, the CPUID instruction can be used to determine: i) the total amount of memory space needed to store all the state information of the extensions 1 and 2; ii) the total amount of memory space needed to store all the state information of just extension 1; and, iii) the total amount of memory space needed to store all the state information of just extension 2.

Here, as the state information for an extension largely corresponds to the information stored in the extension's associated data registers, the processor hardware knows "how large" the register space is for each of its extensions and can readily provide/return such information as a resultant of the CPUID instruction.

As such, in a typical case, software will execute the CPUID instruction to understand how much memory space needs to be allocated for the state information of the various extensions it has enabled, then, proceed to allocate such memory space.

In some embodiments, as a part of the loading process, the processor first reads the contents of a state bit vector field stored in memory to understand which extensions have had their state information stored in memory. The processor then loads into itself from memory the state information of those extensions that have had their state information externally stored in memory as indicated in the state bit vector field.

Figure 2:
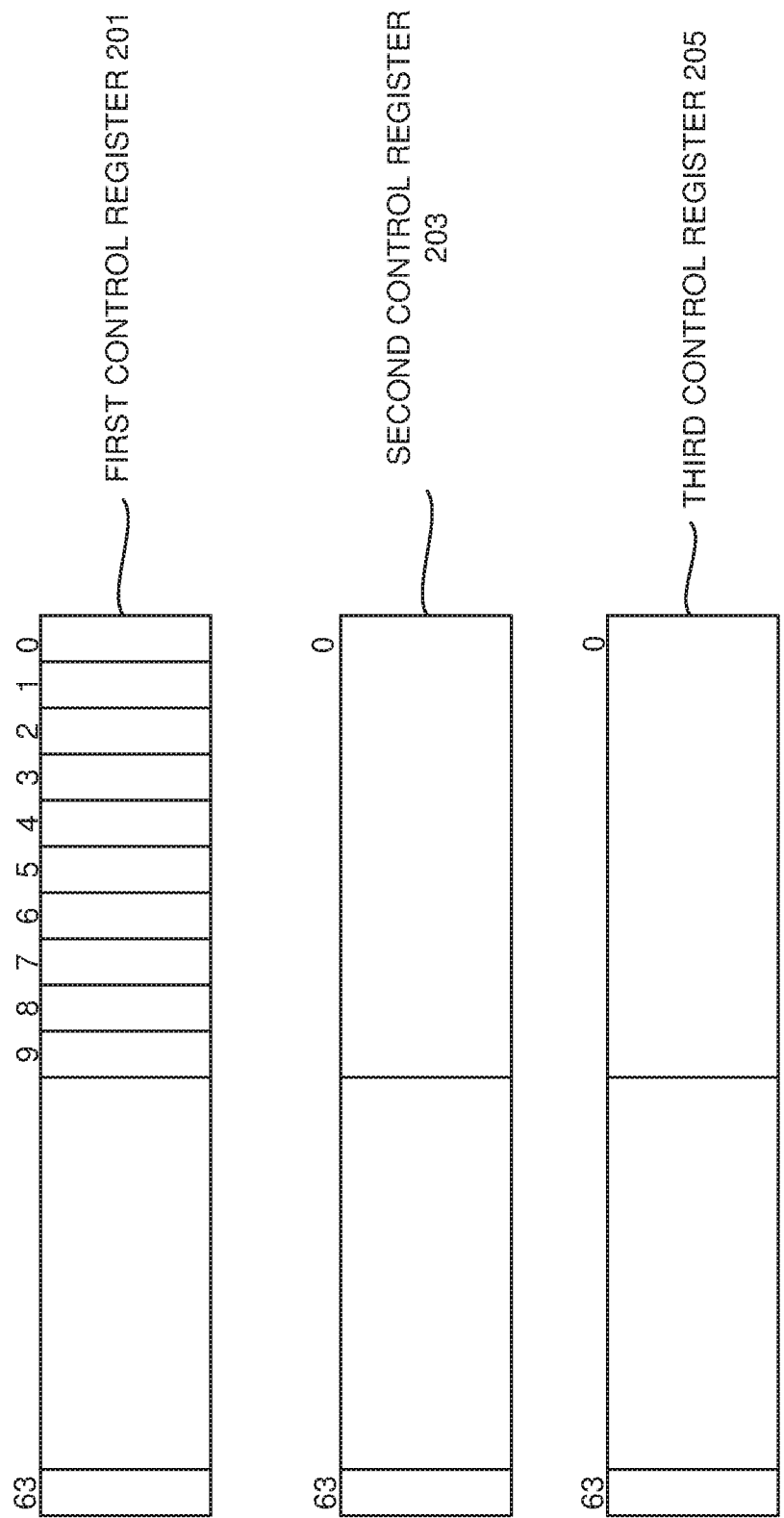
FIG. 2 illustrates control registers used in the XSAVE instruction that does not automatically write all available state information.

To support an XSAVE instruction that does not automatically write all available state information, a processor core utilizes additional control registers beyond XCR0. FIG. 2 illustrates control registers used in the XSAVE instruction that does not automatically write all available state information.

A first control register 201 specifies, for each set bit position, a state of processor components that the OS provides context management (e.g., XCR0). For example, in some embodiments, bit 0 indicates that floating-point is supported, bits 1 and 2 detail that SIMD instructions are supported (e.g., bit 1 indications that 128-bit SIMD registers are supported and bit 2 indications that 256-bit SIMD registers are supported), bits 3 and 4 detail bound register support, bit 5 indicates writemask support, bits 6 and 7 indicate larger than 256-bit SIMD registers support, bit 9 details protection key support, etc. Note that different processor cores may use different bit positions and have more or fewer register types to support. In some embodiments, more than one type of states can be set at one time (for example, bits 6 and 8 along with bits 3 and 4).

A second control register 203 mirrors the bits defined in the first control register 201, but when bits are set in this register 203 it indicates what states the OS wants to look for first use detection. In other words, a first use of, for example, when bit 1 is set, a 128-bit SIMD instruction would cause an exception to be generated which indicates that such an instruction occurred and that these registers (128-bit SIMD) should be saved during XSAVE. Again, more than one type of state can be monitored for first use detection. This detection may occur, for example, in a decode stage of a processor pipeline.

A third control register 205 is used to store which of the state types had an exception generated. For example, if floating-point and 128-bit SIMD instruction are set in the second control register 203 to be monitored for first use, upon an execution of an instruction using either of those instruction types will cause the corresponding bit in the third control register 205 to be set. As such, the OS first sets what instruction types (and therefore register support) it wants to monitor for use in the second control register 203, and upon use, a corresponding bit is set in the third control register 205. Therefore, if only floating-point registers were used, then the 128-bit SIMD registers do not need to be stored, but if both floating-point and 128-bit SIMD registers were used (as indicated in the third control register 205), the both sets of registers are stored during XSAVE.

The use of the second and third control registers 203 and 205 provide the OS an opportunity to detect use of an instruction operating on XSAVE states. At that point, the OS can allocate a new buffer large enough to save all the previously used states as well the states reported in XCR3. This allocation is transparent to the application.

In some embodiments, to track the states used by each software thread, the OS will context switch XCR2 register too.

Figure 3:
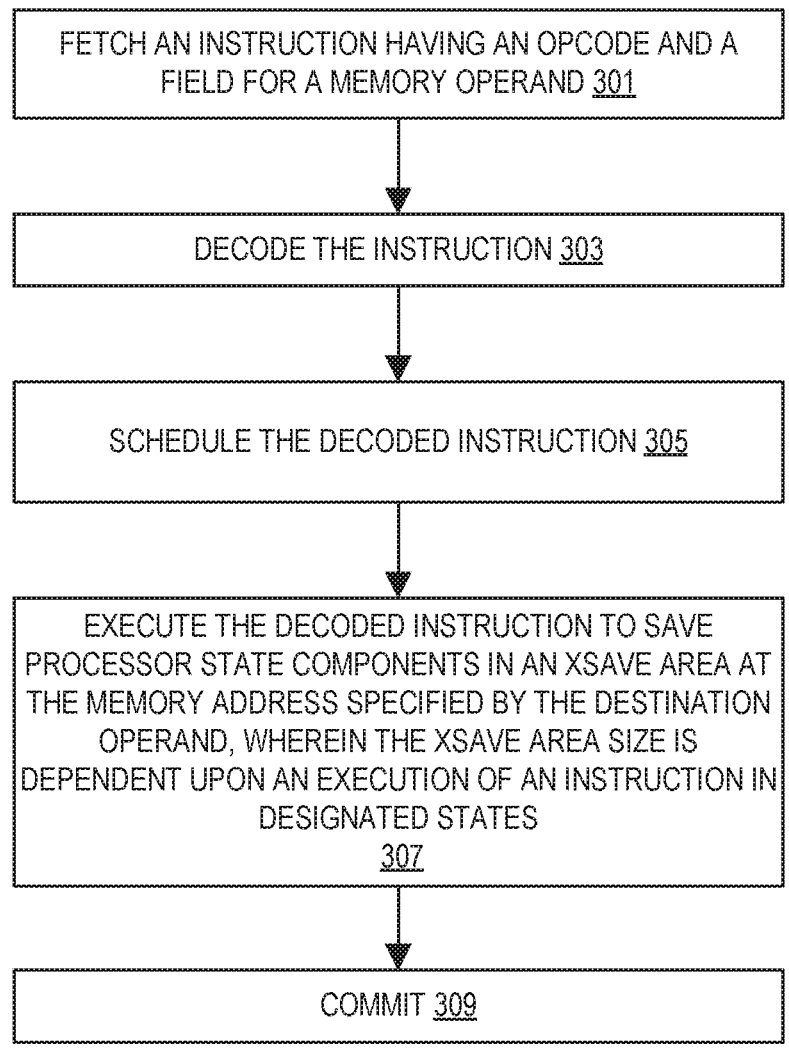
FIG. 3 illustrates an embodiment of an execution of XSAVE utilization by a processor (core) that uses a buffer only large enough to save states that have been detected as being used.

FIG. 3 illustrates an embodiment of an execution of XSAVE utilization by a processor (core) that uses a buffer only large enough to save states that have been detected as being used. At 301, an instruction is fetched. For example, a XSAVE instruction is fetched. The XSAVE instruction includes fields for an opcode and an indication of a memory destination operand. In some embodiments, the instruction is fetched from an instruction cache. The opcode of the XSAVE instruction indicates a full or partial save of processor state components to the XSAVE area located at the memory address specified by the destination operand are to occur using a variable size XSAVE area. In some embodiments, the memory destination is a R/M value.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

The fetched instruction is decoded at 303. For example, the fetched XSAVE instruction is decoded by decode circuitry such as that detailed herein.

The decoded instruction is scheduled (as needed) at 305.

At 307, the decoded instruction is executed by execution circuitry (hardware) such as that detailed herein to save processor state components in an XSAVE area at the memory address specified by the destination operand, wherein the XSAVE area size is dependent upon an execution of an instruction in designated states.

In some embodiments, the instruction is committed or retired at 309.

Figure 4:
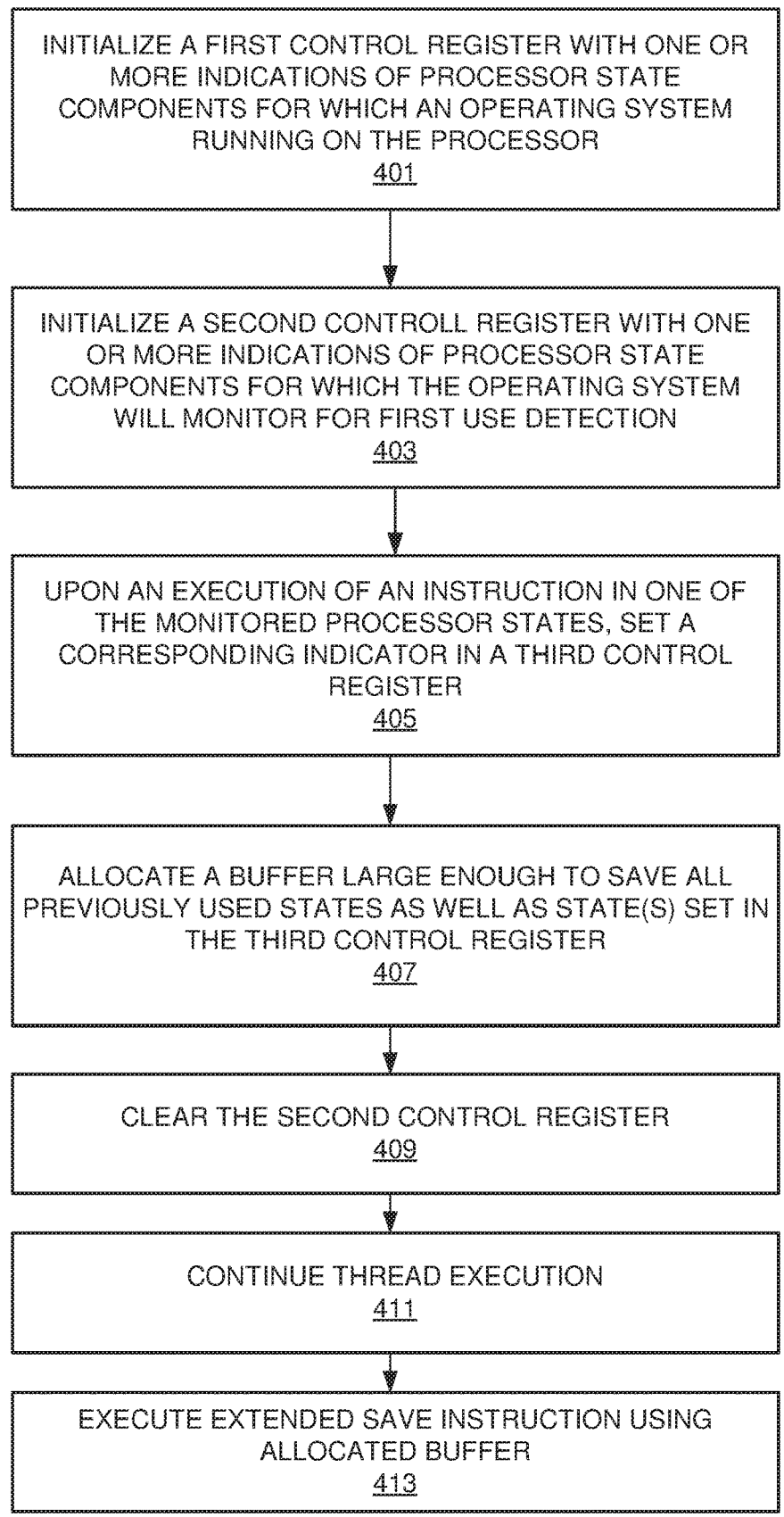
FIG. 4 illustrates an embodiment of an execution of XSAVE utilization by a processor (core) that uses a buffer only large enough to save states that have been detected as being used.

FIG. 4 illustrates an embodiment of an execution of XSAVE utilization by a processor (core) that uses a buffer only large enough to save states that have been detected as being used. This instruction utilizes the first, second, and third control registers detailed above.

At 401, a first control register is initialized with one or more indications of processor state components for which an OS running on the processor supports. For example, floating-point, 128-bit SIMD, and 256-bit SIMD are initialized in the first control register 201 which indicates all are supported.

At 403, a second control register is initialized with one or more indications of processor state components for which the hardware (processor core) will monitor for first use detection 403. For example, floating-point and 128-bit SIMD are initialized in the second control register 203 which indicates that the OS does not care about 256-bit SIMD being context switched via an XSAVE instruction.

During a thread's execution, upon an execution of an instruction in the specified group of processor state(s) of the second control register, a corresponding indicator is set in a third control register at 405. For example, a floating-point instruction is executed, which causes an exception to be thrown and the floating-point bit of the third control register 205 to be set. In some embodiments, the execution of an instruction in the specified group of processor state(s) of the second control register also causes a report of the exception and the indication in the second and third control registers are cleared by the operating system after that report.

A buffer cache is allocated that is large enough to save all previously used states as well as the newly used state as set in the third control register at 407. In other words, each state set in the third control register determines how much of an XSAVE buffer to allocate.

In some embodiments, the execution of an instruction in the specified group of processor state(s) of the second control register also causes that indication in the second control register to be cleared by hardware at 409. This clearing allows for the hardware to not throw an exception upon a subsequent execution of an instruction in the group.

At 411, after the third control register has been set based on the exception and, in some embodiments, the second control and/or third control register(s) appropriately cleared, the thread continues to execute. Note that during the thread execution the hardware will continue to monitor for a first use of the states set in the second control register and, as such, 405-409 may be performed multiple times.

At some point during the thread, an XSAVE instruction is executed at 413. The XSAVE instruction includes fields for an opcode and a memory location. The execution of this XSAVE instruction uses the buffer that had been allocated based on the second and third control registers. For example, if an XSAVE instruction is called after only a floating-point instruction was used, then only the floating-point registers are context switched. Note that multiple XSAVE instructions might be used as different states get used for the first time.

Detailed below are examples of apparatuses and methods supporting XSAVE.

Example 1. An apparatus comprising a decoder to decode an instruction having fields for an opcode and a destination operand, and execution circuitry to execute the decoded instruction to perform a save of processor state components to an area located at a destination memory address specified by the destination operand, wherein a size of the area is defined by at least one indication of an execution of an instruction operating on a specified group of processor states.

Example 2. The apparatus of example 1, further comprising a first control register to store at least one indication of processor state components for which an operating system running on the apparatus supports; a second control register to store at least one indication of processor state components for which hardware is to monitor for first instruction use detection; and a third control register to store the at least one indication of an execution of an instruction operating on a specified group of processor states.

Example 3. The apparatus of example 2, further comprising state management circuitry to perform state management operations including configuring the first, second, and third control registers.

Example 4. The apparatus of example 3, wherein the state management circuitry is further to calculate the size of the area defined by at least one indication of an execution of an instruction operating on a specified group of processor states.

Example 5. The apparatus of example 3, wherein the state management circuitry is further to allocate a buffer cache to save all previously used states as well any state set in the third control register.

Example 6. The apparatus of example 5, wherein the state management circuitry is further to clear the second and third control registers upon the allocation of the buffer cache to save all previously used states as well any state set in the third control register.

Example 7. The apparatus of any of examples 2-6, wherein the execution circuitry is to support an instruction which when decoded and executed is to cause the second and third control registers to be cleared after the allocation of the buffer cache to save all previously used states as well any state set in the third control register.

Example 8. The apparatus of any of examples 2-7, wherein the execution circuitry is to save state components specified by a data register and accumulator register pair that is logically ANDed with the third control register.

Example 9. The apparatus of any of examples 1-8, wherein an available at least one indication of an execution of an instruction operating on a specified group of processor states is usage of 128-bit registers, 256-bit registers, 512-bit registers, and floating-point registers.

Example 10. A method comprising decoding an instruction having fields for an opcode and a destination operand, and executing the decoded instruction to perform a save of processor state components to an area located at a destination memory address specified by the destination operand, wherein a size of the area is defined by at least one indication of an execution of an instruction operating on a specified group of processor states.

Example 11. The method of example 10, further comprising: using a first control register to store at least one indication of processor state components for which an operating system running on the apparatus supports, using a second control register to store at least one indication of processor state components for which hardware is to monitor for first instruction use detection, and using a third control register to store the at least one indication of an execution of an instruction operating on a specified group of processor states.

Example 12. The method of example 11, further comprising using state management circuitry to perform state management operations including configuring the first, second, and third control registers.

Example 13. The method of example 12, further comprising calculating the size of the area defined by at least one indication of an execution of an instruction operating on a specified group of processor states.

Example 14. The method of example 12, further comprising allocating a buffer cache to save all previously used states as well any state set in the third control register.

Example 15. The method of example 14, further comprising clearing the second and third control registers upon the allocation of the buffer cache to save all previously used states as well any state set in the third control register.

Example 16. The method of any of examples 11-15, wherein an available at least one indication of an execution of an instruction operating on a specified group of processor states is usage of 128-bit registers, 256-bit registers, 512-bit registers, and floating-point registers.

Example 17. An apparatus comprising means for decoding an instruction having fields for an opcode and a destination operand and means for executing the decoded instruction to perform a save of processor state components to an area located at a destination memory address specified by the destination operand, wherein a size of the area is defined by at least one indication of an execution of an instruction operating on a specified group of processor states.

Example 18. The apparatus of example 17, further comprising a first storage means for storing at least one indication of processor state components for which an operating system running on the apparatus supports, a second storage means for storing at least one indication of processor state components for which hardware is to monitor for first instruction use detection, and a third storage means for storing the at least one indication of an execution of an instruction operating on a specified group of processor states.

Example 19. The apparatus of example 18, further comprising means for performing state management operations including configuring the first, second, and third storage means.

Example 20. The apparatus of example 19, wherein the means for performing state management operations is further to calculate the size of the area defined by at least one indication of an execution of an instruction operating on a specified group of processor states.

Example 21. The apparatus of example 19, wherein the means for performing state management operations is further to allocate a buffer cache to save all previously used states as well any state set in the third storage means.

Example 22. The apparatus of example 21, wherein the means for performing state management operations is further to clear the second and third storage means upon the allocation of the buffer cache to save all previously used states as well any state set in the third storage means.

Example 23. The apparatus of any of examples 19-22, wherein means for executing is to support an instruction which when decoded and executed is to cause the second and third control registers to be cleared after the allocation of the buffer cache to save all previously used states as well any state set in the third storage means.

Example 24. The apparatus of any of examples 19-23, wherein the means for executing is to save state components specified by a data register and accumulator register pair that is logically ANDed with the third storage means.

Example 25. The apparatus of any of examples 19-24, wherein an available at least one indication of an execution of an instruction operating on a specified group of processor states is usage of 128-bit registers, 256-bit registers, 512-bit registers, and floating-point registers.

Detailed below are examples of processors, systems, and architectural details for supporting XSAVE.

Exemplary Register Architecture

FIG. 5 is a block diagram of a register architecture 500 according to one embodiment of the invention. In the embodiment illustrated, there are 32 vector registers 510 that are 512 bits wide; these registers are referenced as zmm0 through zmm31. The lower order 256 bits of the lower 8 zmm registers are overlaid on registers ymm0-15. The lower order 128 bits of the lower 8 zmm registers (the lower order 128 bits of the ymm registers) are overlaid on registers xmm0-15.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit and a scalar registers unit. These register units may provide architectural vector registers, vector mask registers, and general purpose registers. The physical register file(s)

unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7B:
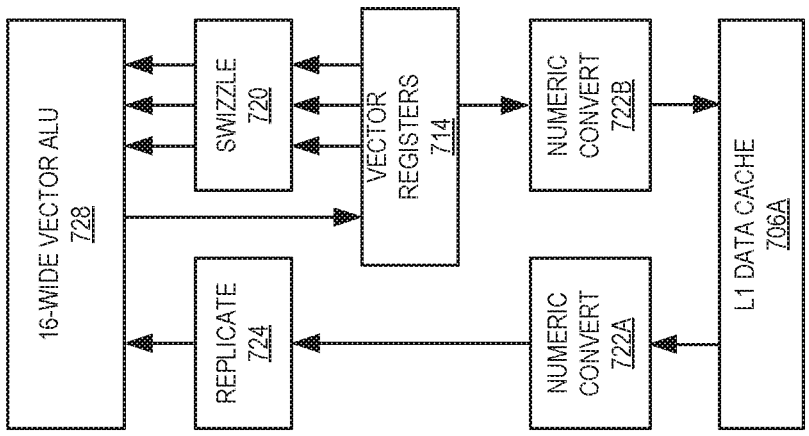
FIGS. 7A-B illustrate a block diagram of a more specific exemplary in-order core architecture, which core would be one of several logic blocks (including other cores of the same type and/or different types) in a chip.
Figure 7A:
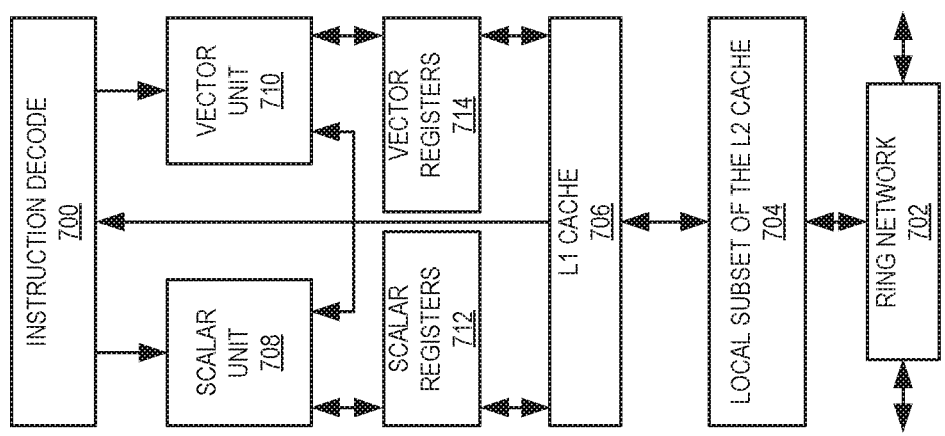

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 702 and with its local subset of the Level 2 (L2) cache 704, according to embodiments of the invention. In one embodiment, an instruction decoder 700 supports the x86 instruction set with a packed data instruction set extension. An L1 cache 706 allows low-latency accesses to cache memory into the scalar and vector units. While in one embodiment (to simplify the design), a scalar unit 708 and a vector unit 710 use separate register sets (respectively, scalar registers 712 and vector registers 714) and data transferred between them is written to memory and then read back in from a level 1 (L1) cache 706, alternative embodiments of the invention may use a different approach (e.g., use a single register set or include a communication path that allow data to be transferred between the two register files without being written and read back).

The local subset of the L2 cache 704 is part of a global L2 cache that is divided into separate local subsets, one per processor core. Each processor core has a direct access path to its own local subset of the L2 cache 704. Data read by a processor core is stored in its L2 cache subset 704 and can be accessed quickly, in parallel with other processor cores accessing their own local L2 cache subsets. Data written by a processor core is stored in its own L2 cache subset 704 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 7B is an expanded view of part of the processor core in FIG. 7A according to embodiments of the invention. FIG. 7B includes an L1 data cache 706A part of the L1 cache 704, as well as more detail regarding the vector unit 710 and the vector registers 714. Specifically, the vector unit 710 is a 8-wide vector processing unit (VPU) (see the 16-wide ALU 728), which executes one or more of integer, single-precision float, and double-precision float instructions. The VPU supports swizzling the register inputs with swizzle unit 720, numeric conversion with numeric convert units 722A-B, and replication with replication unit 724 on the memory input.

Processor with Integrated Memory Controller and Graphics

Figure 8:
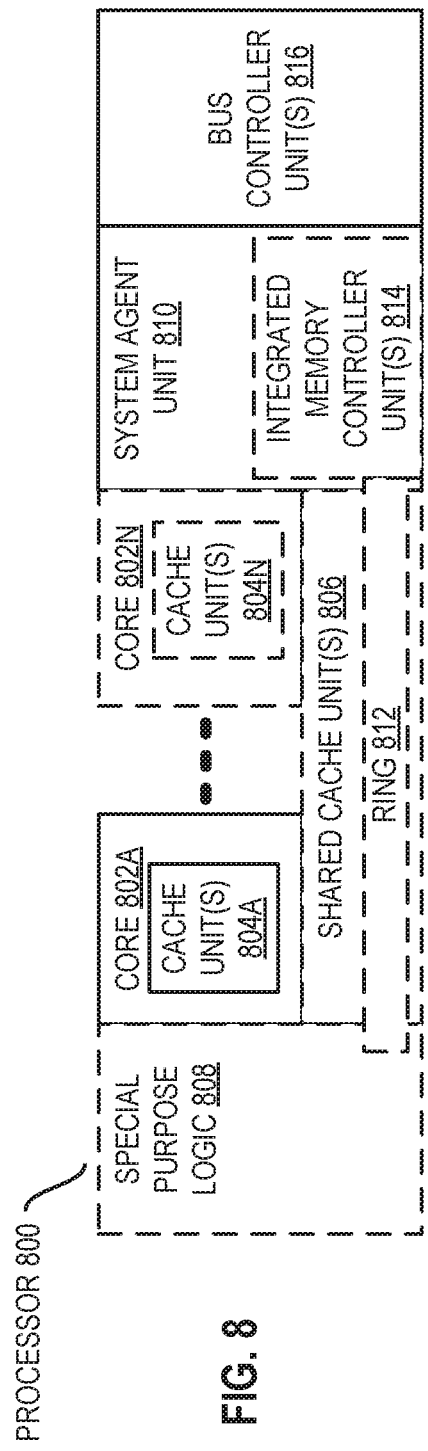
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores 804A-N, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802-A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
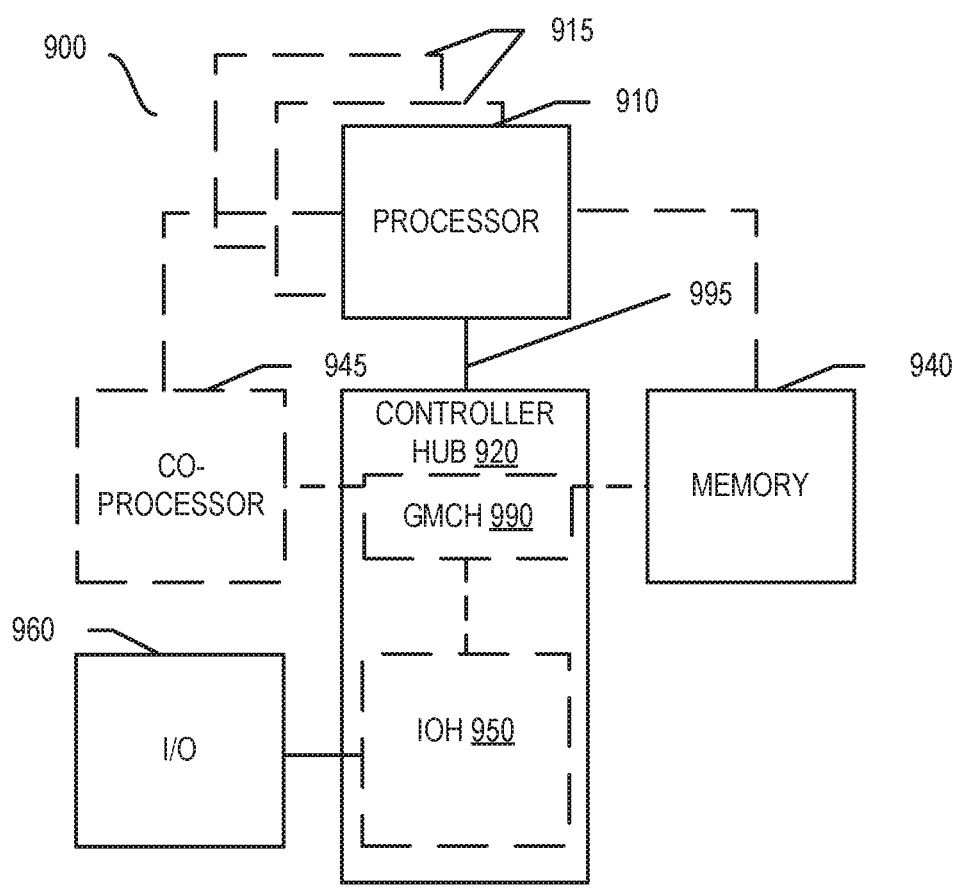
FIGS. 9-12 are block diagrams of exemplary computer architectures.

Referring now to FIG. 9, shown is a block diagram of a system 900 in accordance with one embodiment of the present invention. The system 900 may include one or more processors 910, 915, which are coupled to a controller hub 920. In one embodiment, the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface, or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 9155 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 10:
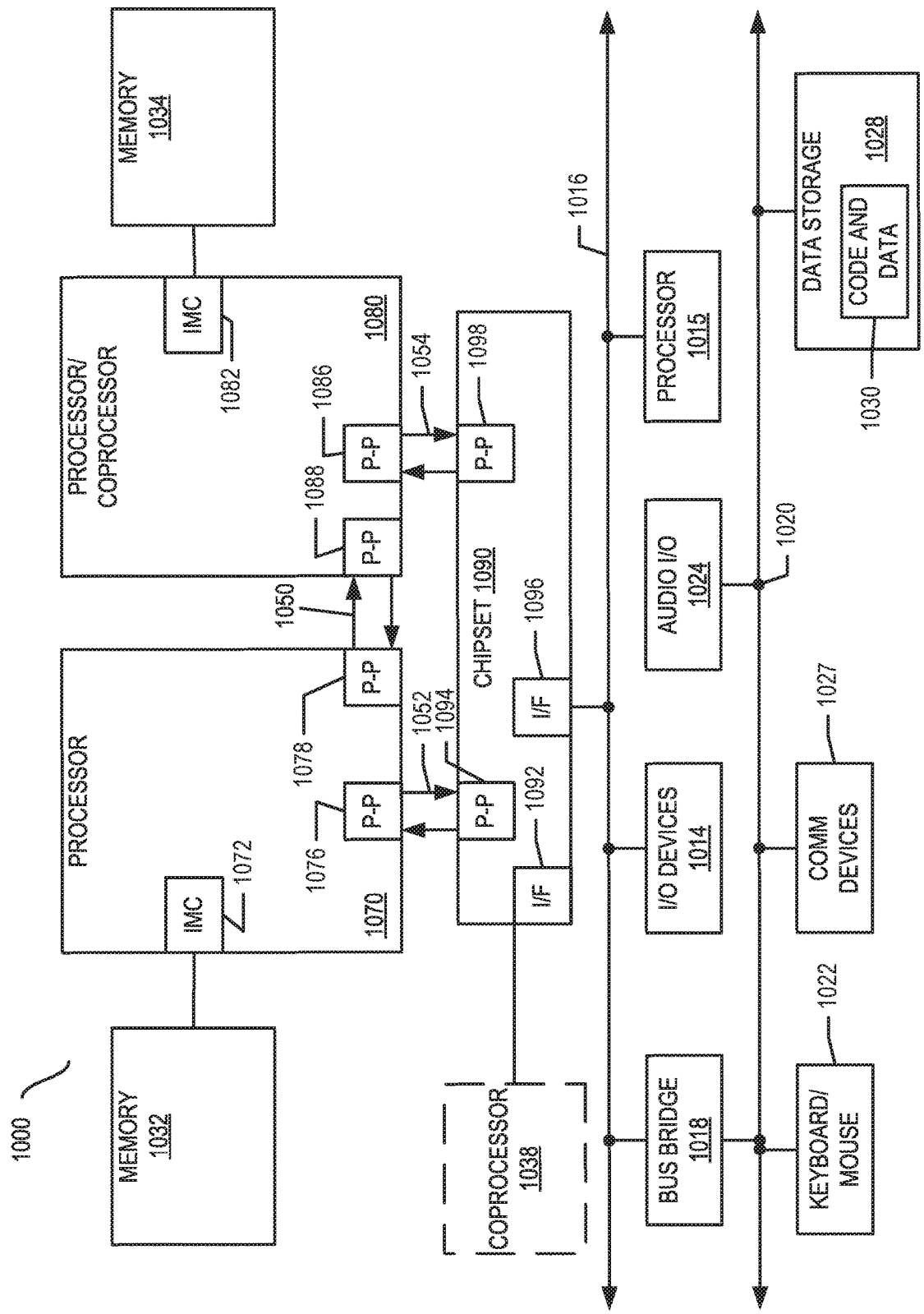

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1016. Note that other architectures are possible. For example, instead of the point-to-point architecture of FIG. 10, a system may implement a multi-drop bus or other such architecture.

Figure 11:
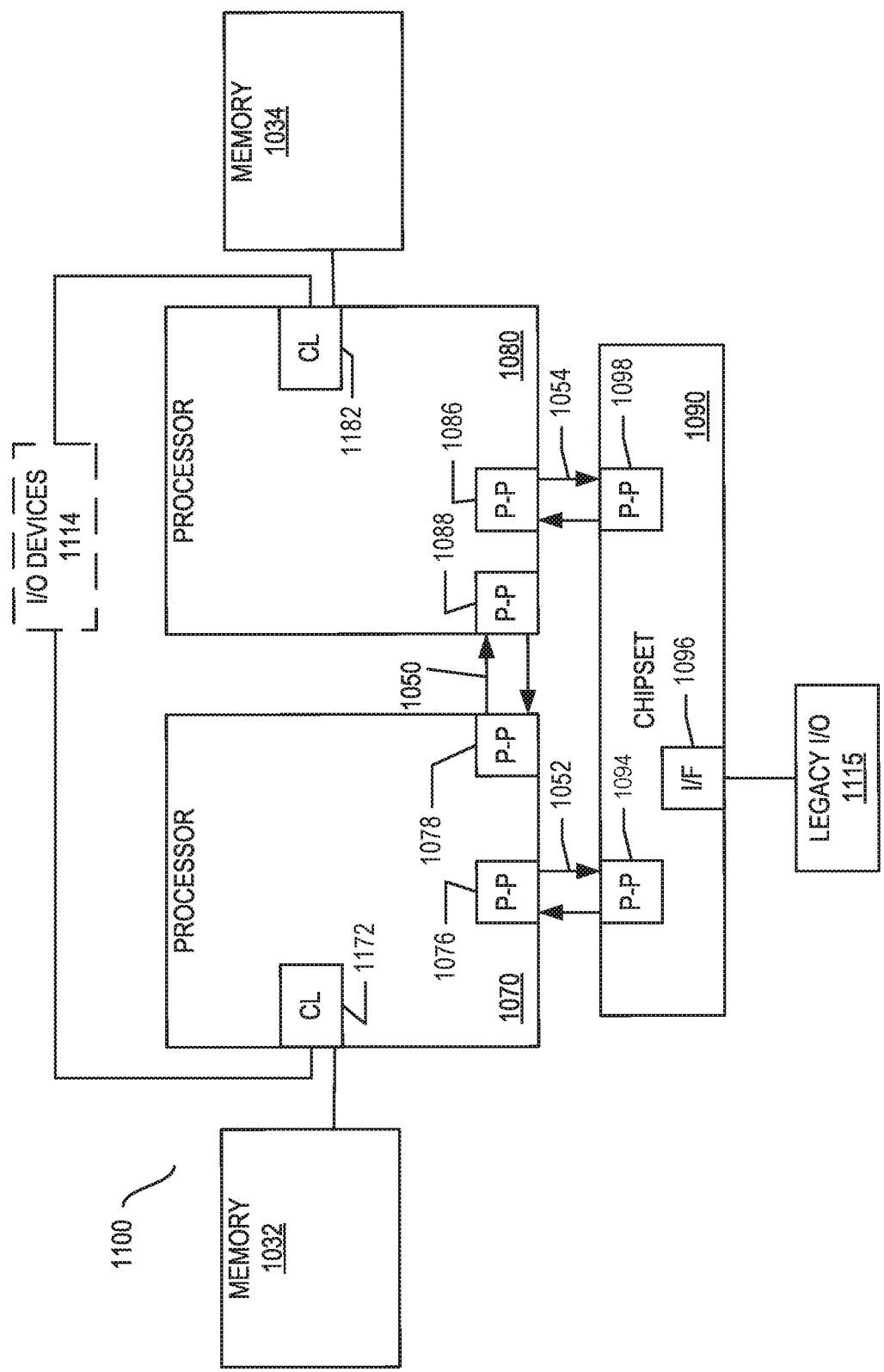

Referring now to FIG. 11, shown is a block diagram of a second more specific exemplary system 1100 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1070, 1080 may include integrated memory and I/O control logic ("CL") 1172 and 1182, respectively. Thus, the CL 1172, 1182 include integrated memory controller units and include I/O control logic. FIG. 11 illustrates that not only are the memories 1032, 1034 coupled to the CL 1172, 1182, but also that I/O devices 1114 are also coupled to the control logic 1072, 1082. Legacy I/O devices 1115 are coupled to the chipset 1090.

Figure 12:
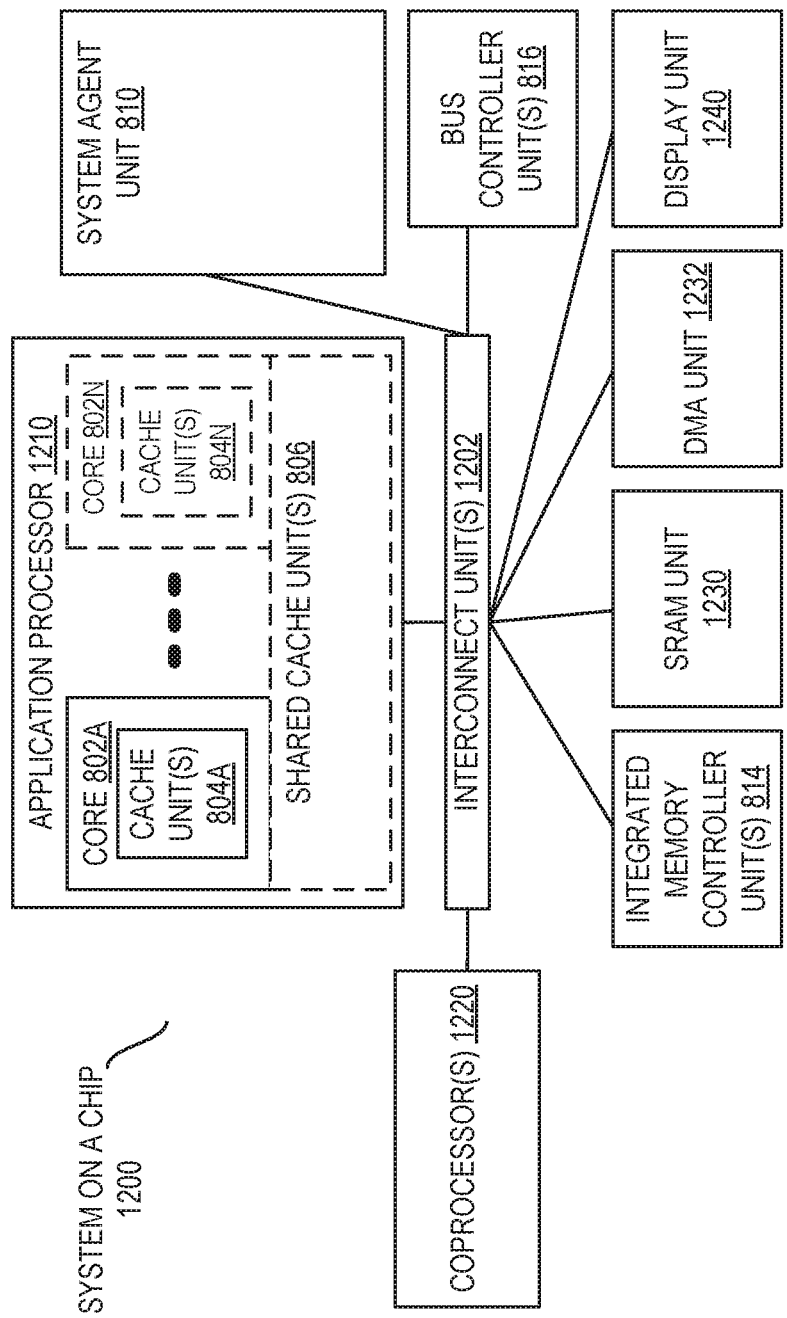

Referring now to FIG. 12, shown is a block diagram of a SoC 1200 in accordance with an embodiment of the present invention. Similar elements in FIG. 8 bear like reference numerals. Also, dashed lined boxes are optional features on more advanced SoCs. In FIG. 12, an interconnect unit(s) 1202 is coupled to: an application processor 1210 which includes a set of one or more cores 122A-N, cache units 804A-N, and shared cache unit(s) 806; a system agent unit 810; a bus controller unit(s) 816; an integrated memory controller unit(s) 814; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 13:
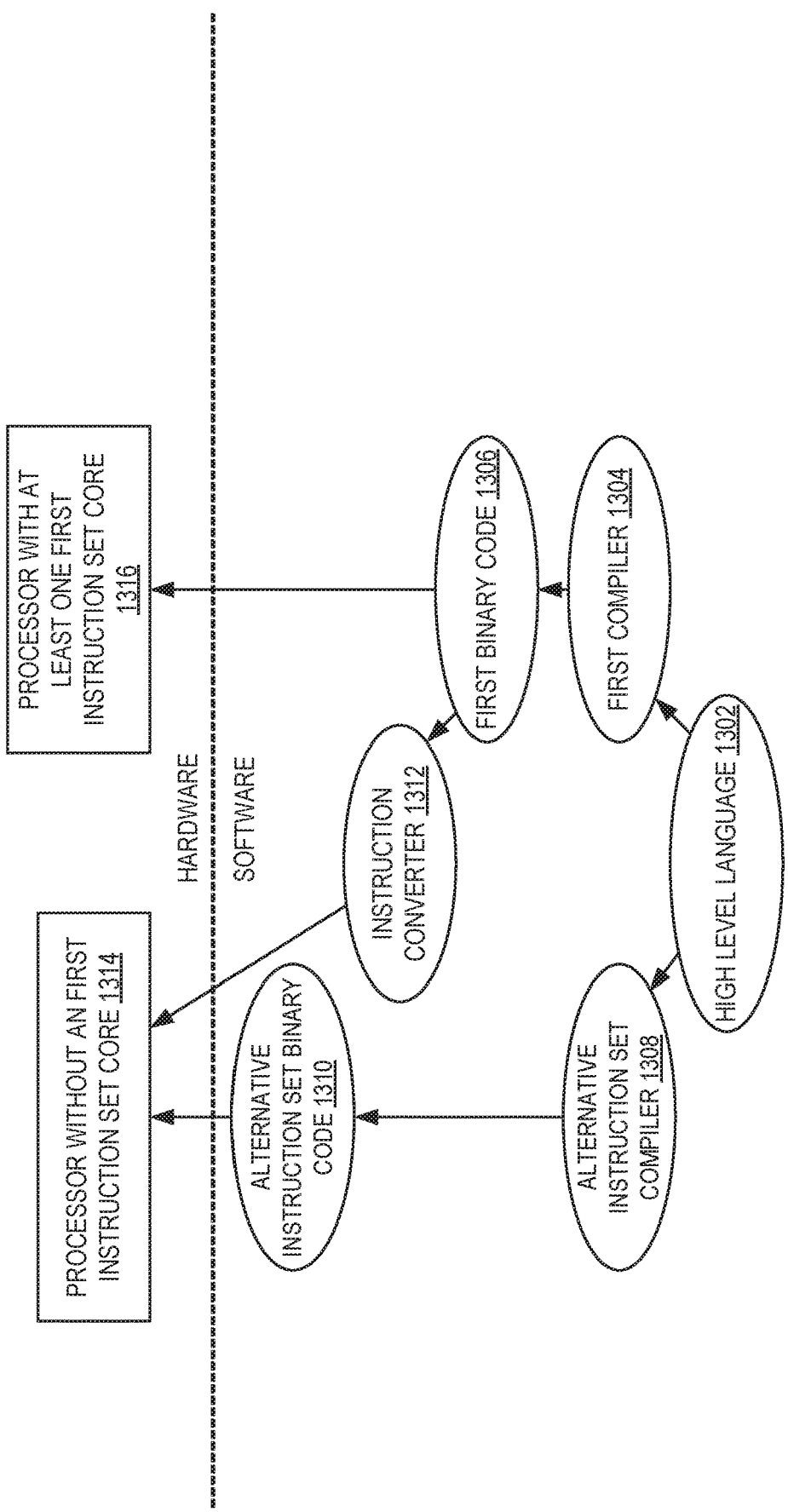
FIG. 13 is a block diagram contrasting the use of a software instruction converter to convert binary instructions in a source instruction set to binary instructions in a target instruction set according to embodiments of the invention.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an first compiler 1304 to generate a first binary code (e.g., x86) 1306 that may be natively executed by a processor with at least one first instruction set core 1316. In some embodiments, the processor with at least one first instruction set core 1316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1304 represents a compiler that is operable to generate binary code of the first instruction set 1306 (e.g., object code) that can, with or without additional linkage processing, be executed on the processor with at least one first instruction set core 1316. Similarly, FIG. 13 shows the program in the high level language 1302 may be compiled using an alternative instruction set compiler 1308 to generate alternative instruction set binary code 1310 that may be natively executed by a processor without at least one first instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the first binary code 1306 into code that may be natively executed by the processor without an first instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have a first instruction set processor or core to execute the first binary code 1306.

We claim:

1. An apparatus comprising:
a first control register to store at least one indication of processor state components for which an operating system running on the apparatus supports;
a second control register to store at least one indication of processor state components for which hardware is to monitor for first instruction use detection;
a third control register to store the at least one indication of an execution of an instruction operating on a specified group of processor states;
a decoder to decode an instruction having fields for an opcode and a destination operand; and
execution circuitry to execute the decoded instruction to perform a save of processor state components to an area located at a destination memory address specified by the destination operand, wherein a size of the area is defined by at least one indication of an execution of an instruction operating on a specified group of processor states.

2. The apparatus of claim 1, further comprising:
state management circuitry to perform state management operations including configuring the first, second, and third control registers.

3. The apparatus of claim 2, wherein the state management circuitry is further to calculate the size of the area defined by at least one indication of an execution of an instruction operating on a specified group of processor states.

4. The apparatus of claim 2, wherein the state management circuitry is further to allocate a buffer cache to save all previously used states as well any state set in the third control register.

5. The apparatus of claim 4, wherein the state management circuitry is further to clear the second and third control registers upon the allocation of the buffer cache to save all previously used states as well any state set in the third control register.

6. The apparatus of claim 2, wherein the execution circuitry to support an instruction which when decoded and executed is to cause the second and third control registers to be cleared after the allocation of the buffer cache to save all previously used states as well any state set in the third control register.

7. The apparatus of claim 1, wherein the execution circuitry is to save state components specified by a data register and accumulator register pair that is logically ANDed with the third control register.

8. The apparatus of claim 1, wherein an available at least one indication of an execution of an instruction operating on a specified group of processor states is usage of 128-bit registers, 256-bit registers, 512-bit registers, and floating-point registers.

9. A method comprising:
using a first control register to store at least one indication of processor state components for which an operating system running supports;
using a second control register to store at least one indication of processor state components for which hardware is to monitor for first instruction use detection;
using a third control register to store the at least one indication of an execution of an instruction operating on a specified group of processor states;
decoding an instruction having fields for an opcode and a destination operand; and
executing the decoded instruction to perform a save of processor state components to an area located at a destination memory address specified by the destination operand, wherein a size of the area is defined by at least one indication of an execution of an instruction operating on a specified group of processor states.

10. The method of claim 9, further comprising:
using state management circuitry to perform state management operations including configuring the first, second, and third control registers.

11. The method of claim 10, further comprising:
calculating the size of the area defined by at least one indication of an execution of an instruction operating on a specified group of processor states.

12. The method of claim 10, further comprising:
allocating a buffer cache to save all previously used states as well any state set in the third control register.

13. The method of claim 12, further comprising:
clearing the second and third control registers upon the allocation of the buffer cache to save all previously used states as well any state set in the third control register.

14. The method of claim 9, wherein an available at least one indication of an execution of an instruction operating on a specified group of processor states is usage of 128-bit registers, 256-bit registers, 512-bit registers, and floating point registers.

15. An apparatus comprising:
a first storage means for storing at least one indication of processor state components for which an operating system running on the apparatus supports;
a second storage means for storing at least one indication of processor state components for which hardware is to monitor for first instruction use detection;
a third storage means for storing the at least one indication of an execution of an instruction operating on a specified group of processor states;
means for decoding an instruction having fields for an opcode and a destination operand; and
means for executing the decoded instruction to perform a save of processor state components to an area located at a destination memory address specified by the destination operand, wherein a size of the area is defined by at least one indication of an execution of an instruction operating on a specified group of processor states.

16. The apparatus of claim 15, further comprising:
means for performing state management operations including configuring the first, second, and third storage means.

17. The apparatus of claim 16, wherein the means for performing state management operations is further to calculate the size of the area defined by at least one indication of an execution of an instruction operating on a specified group of processor states.

* * * * *